(12) United States Patent
Wigren et al.

(10) Patent No.: US 10,399,237 B2
(45) Date of Patent: Sep. 3, 2019

(54) CONTROLLING A VACUUM SYSTEM COMPRISING A VACUUM GENERATOR

(71) Applicant: Xerex AB, Täby (SE)

(72) Inventors: Gustaf Wigren, Vaxholm (SE); Peter Engborg, Skogås (SE)

(73) Assignee: Piab Aktiebolag, Taby (SE)

( * ) Notice: Subject to any disclaimer, the term of this patent is extended or adjusted under 35 U.S.C. 154(b) by 5 days.

(21) Appl. No.: 15/619,680

(22) Filed: Jun. 12, 2017

(65) Prior Publication Data
US 2017/0355083 A1 Dec. 14, 2017

(30) Foreign Application Priority Data

Jun. 10, 2016 (EP) ..................................... 16173958

(51) Int. Cl.
*B25J 15/06* (2006.01)
*B65G 47/91* (2006.01)
*F04F 5/52* (2006.01)

(52) U.S. Cl.
CPC ....... *B25J 15/0633* (2013.01); *B25J 15/0625* (2013.01); *B25J 15/0658* (2013.01); *B65G 47/917* (2013.01); *F04F 5/52* (2013.01)

(58) Field of Classification Search
CPC .. B25J 15/0616; B25J 15/065; B25J 15/0658; B25J 15/0675; B25J 15/0633;
(Continued)

(56) References Cited

U.S. PATENT DOCUMENTS 5,188,411 A 2/1993 Golden
5,320,497 A * 6/1994 Nagai .................... B65G 47/91
417/186

(Continued)

FOREIGN PATENT DOCUMENTS

EP 1064464 A2 1/2001
EP 1232990 A2 * 8/2002 ........... B65G 47/918
(Continued)

OTHER PUBLICATIONS

Extended European Search Report for corresponding European Patent Application No. 17175322.1 dated Nov. 9, 2017.

*Primary Examiner* — Gabriela M Puig
(74) *Attorney, Agent, or Firm* — Renner, Otto, Boisselle & Sklar, LLP

(57) ABSTRACT

A method for controlling a vacuum generator (3) in a vacuum system (10) for transportation of objects, which vacuum system (10) comprises a vacuum generator (3) driven by a compressed air flow via a first on/off valve (1), wherein the vacuum generator (3) is arranged to be brought in flow connection with the vacuum gripper means (6) comprised in the vacuum system (10), in order to supply vacuum to the vacuum gripper means (6) in result of the compressed air flow, wherein the vacuum system (10) comprises a second valve (2), which is arranged to supply compressed air into the vacuum system (10); one centralized pressure sensor (4) used for monitoring a system pressure (P) inside the vacuum system (10) and for adaptive blow-off; and a vacuum system controller (5), wherein if the on/off valve (1) is not flowing air to the vacuum generator (3), the vacuum system controller (5) indicates a state of no vacuum generation, and the second valve (2) is activated, allowing an amount of compressed air to flow into the vacuum-system (10) for blow-off, using vacuum system properties being characterized with respect to volume and flow-restriction in relation to the blow-off capacity of the blow-off function and for every release cycle wherein blow-off is terminated and excessive air injected into the system is released through the vacuum gripper means, analyzing pressure propagation following blow-off for calculating a duration of when the vacuum system (10) is being fully pressure-equalized (E) in parts of the vacuum gripper means by using a compensation (Continued)

Figure 1:
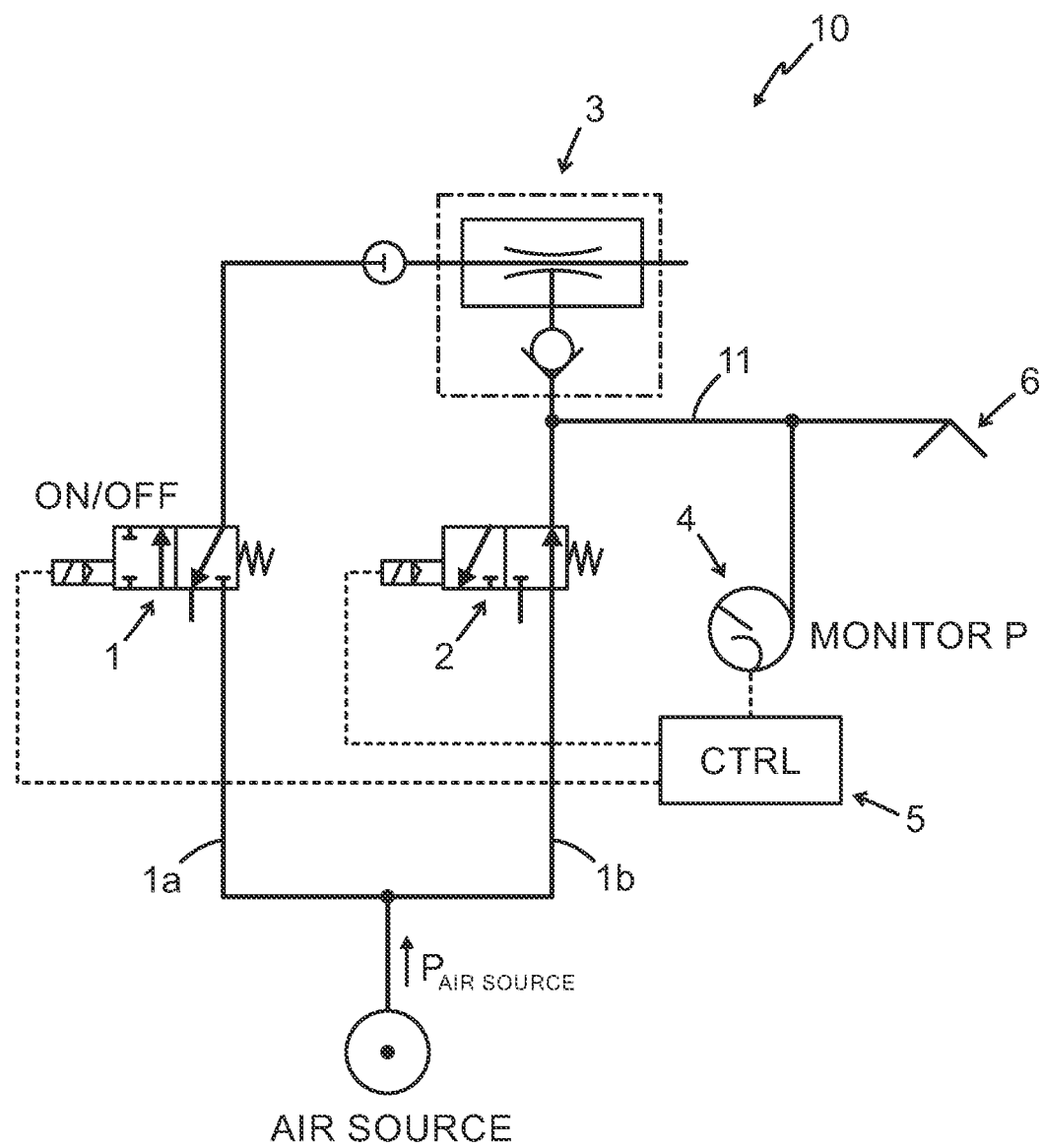

factor (k), wherein the compensation factor (k) is stored and used for the next release cycle.

11 Claims, 2 Drawing Sheets

(58) Field of Classification Search
CPC .. B25J 15/0625; B66C 1/0256; B66C 1/0268; B65G 47/917; F04F 5/52
USPC .......................................... 294/186, 183, 185
See application file for complete search history.

(56) References Cited

U.S. PATENT DOCUMENTS

| | | | |
|---|---|---|---|
| 6,384,360 B1* | 5/2002 | Masuo | H05K 13/0409 |
| | | | 209/573 |
| 7,950,422 B2 | 5/2011 | Perlman et al. | |
| 2005/0200069 A1* | 9/2005 | Marton | B65G 49/061 |
| | | | 271/90 |
| 2008/0202602 A1* | 8/2008 | Flaim | B25J 15/0052 |
| | | | 137/488 |
| 2015/0052990 A1 | 2/2015 | Dunkmann et al. | |
| 2017/0203929 A1* | 7/2017 | Wigren | B66C 1/0268 |

FOREIGN PATENT DOCUMENTS

| | | |
|---|---|---|
| EP | 2263011 B1 | 9/2013 |
| WO | 99/49216 | 9/1999 |
| WO | 2009/120132 A1 | 10/2009 |

* cited by examiner

CONTROLLING A VACUUM SYSTEM COMPRISING A VACUUM GENERATOR

This application claims priority of European Application No. 16173958.6 filed Jun. 10, 2016 which is hereby incorporated herein by reference.

TECHNICAL FIELD

The present disclosure relates to a method of controlling, and a controller for, a vacuum system comprising a vacuum generator driven by compressed air in order to generate a negative pressure applicable for suction cups or similar devices.

BACKGROUND

The present invention relates generally to material handling systems and, more particularly, to controlling a vacuum generator for suction cups of material handling systems that are engaged with the objects and substantially sealed thereto via operation of the vacuum system comprising the vacuum generator and the suction cups. It is known to provide a material handling system that includes suction cups or the like that are adapted to be moved into engagement with an object, such as a substantially flat object or panel or the like, and to lift and move the object to a desired location. The suction cups may be moved into engagement with the object, and the vacuum generator may be actuated to create a vacuum between the object and a suction cup such that the object is retained to the suction cup as it is transported to the desired location.

The vacuum generated at the suction cup(s) is provided by the vacuum generator in the vacuum system, whereby pressurized air is supplied or provided to the vacuum generator.

When the air supply to the vacuum generator is deactivated, such that no vacuum is generated, the vacuum in the vacuum system may dissipate through a vent that connects the vacuum system to an atmosphere outside of the system, and when the vacuum has dissipated in the system and in the cup, to a sufficient amount, the suction cup may be released from the object.

Prior art devices are known from e.g. EP-1064464 where it is disclosed a vacuum ejector pump for generating a negative pressure used for transportation or lifting purposes. And in, U.S. Pat. No. 7,950,422 where it is disclosed an auto-release vacuum device for a material handling system.

It is known, in order to reduce cycle times in industrial production lines, to provide vacuum generators having arrangements for the active release of objects from the suction cup(s).

Prior art devices are known from e.g. EP-B1-2263011 where it is disclosed a vacuum generator, driven by high-pressure air, and having means arranged for active release of an object that is gripped by means of a suction cup.

Active release can for instance be provided by means of activating so-called "blow off". Blow-off means actively supplying compressed air into the vacuum system to release an object that is gripped by means of a suction cup.

Blow-off using compressed air is expensive in terms of energy-use due to the fact that there is a consumption of compressed air and also in terms of increased cycle time due to the fact that blow-off takes time. Nevertheless, blow-off has to be activated a period of time long enough for the object to be released, but preferably as short as possible to save energy and reduce cycle-time.

Therefore, normally blow-off is set a fixed time in the vacuum system, but to ensure that the period of time blow-off is activated is still long enough for the object to be released, blow-off is normally activated longer than necessary to ensure that the object is released consistently for each cycle.

Also other factors of the vacuum system influence blow-off activation duration. For instance gripper designs vary a lot which influences the blow-off efficiency as well as blow-off activation duration. Other factors that influence are for instance: dimensions of vacuum channels, volume of channels and other parts of the vacuum system.

Also the number of suction points influence, as well as compressed air injection point for blow-off.

A problem is that sensing vacuum pressure in each suction point requires multiple vacuum sensors and typically complex data management.

An object of the present invention is to provide a method, control unit and vacuum system for controlling a vacuum ejector device that eliminates, or at least mitigates, the above stated drawbacks.

SUMMARY

The above-mentioned object is achieved by the present invention according to the aspects and embodiments of the independent claims. Preferred embodiments are set forth in the dependent claims.

According to aspect of the present invention there is provided adaptive blow-off in a centralized vacuum system using only a single centralized vacuum pressure sensor and activating, typically opening, a "blow-off valve" during a period of time until a blow-off is considered finished and the blow-off valve is closed. Thus, the opening and/or in particular the closing of the blow-off valve is controlled.

According to an embodiment, there is provided a method for controlling a vacuum generator in a vacuum system for transportation of objects. The vacuum system comprises a vacuum generator driven by a compressed air flow via a first on/off valve. The vacuum generator is arranged to be brought in flow connection with the vacuum gripper means comprised in the vacuum system, in order to supply vacuum to the vacuum gripper means in result of the compressed air flow. The vacuum system further comprises a second valve for blow-off, which is arranged to supply compressed air into the vacuum system; one centralized pressure sensor used for monitoring a system pressure inside the vacuum system and for adaptive blow-off; and a vacuum system controller. If the on/off valve is not flowing air to the vacuum generator, the controller indicates a state of no vacuum generation, and the second valve is activated, typically held opened, allowing an amount of compressed air to flow into the vacuum-system for blow-off, the method comprises using vacuum system properties being characterized with respect to volume and flow-restriction in relation to the blow-off capacity of the blow-off function and for every release cycle wherein blow-off is terminated and excessive air injected into the system is released through the vacuum gripper means, analyzing pressure propagation following blow-off for calculating a duration of when the vacuum system is being fully pressure-equalized in parts of the vacuum gripper means by using a compensation factor, wherein the compensation factor is stored and used for the next release cycle.

According to another aspect, there is provided a controller for controlling a vacuum generator in a vacuum system for transportation of objects. The vacuum system comprises a vacuum generator driven by a compressed air flow via a first on/off valve. The vacuum generator being part of the vacuum system is arranged to be brought in flow connection with the vacuum gripper means comprised in the vacuum system, in order to supply vacuum to the vacuum gripper means in result of the compressed air flow, wherein the vacuum system comprises a second valve arranged to supply compressed air into the vacuum system; The vacuum generator is arranged to be brought in flow connection with the vacuum gripper means comprised in the vacuum system, in order to supply vacuum to the vacuum gripper means in result of the compressed air flow. The vacuum system further comprises a second valve for blow-off, which is arranged to supply compressed air into the vacuum system; one centralized pressure sensor used for monitoring a system pressure inside the vacuum system and for adaptive blow-off; and a vacuum system controller. If the on/off valve is not flowing air to the vacuum generator, the controller indicates a state of no vacuum generation, and the second valve is activated, typically held opened, allowing an amount of compressed air to flow into the vacuum-system for blow-off, the controller is arranged to use vacuum system properties being characterized with respect to volume and flow-restriction in relation to the blow-off capacity of the blow-off function and for every release cycle wherein blow-off is terminated and excessive air injected into the system is released through the vacuum gripper means, analyzing pressure propagation following blow-off for calculating a duration of when the vacuum system is being fully pressure-equalized in parts of the vacuum gripper means by using a compensation factor, wherein the compensation factor is stored and used for the next release cycle.

According to another aspect, there is provided a vacuum system for transportation of objects. The vacuum system comprises a vacuum generator driven by a compressed air flow via a first on/off valve, wherein the vacuum generator is arranged to be brought in flow connection with the vacuum gripper means comprised in the vacuum system, in order to supply vacuum to the vacuum gripper means in result of the compressed air flow. The vacuum generator is arranged to be brought in flow connection with the vacuum gripper means comprised in the vacuum system, in order to supply vacuum to the vacuum gripper means in result of the compressed air flow. The vacuum system further comprises a second valve for blow-off, which is arranged to supply compressed air into the vacuum system; one centralized pressure sensor used for monitoring a system pressure inside the vacuum system and for adaptive blow-off; and a vacuum system controller. If the on/off valve is not flowing air to the vacuum generator, the controller indicates a state of no vacuum generation, such as an indication "not to generate vacuum any more", and the second valve is activated, typically held opened, allowing an amount of compressed air to flow into the vacuum-system for blow-off, the controller is arranged to use vacuum system properties being characterized with respect to volume and flow-restriction in relation to the blow-off capacity of the blow-off function and for every release cycle wherein blow-off is terminated and excessive air injected into the system is released through the vacuum gripper means, analyzing pressure propagation following blow-off for calculating a duration of when the vacuum system is being fully pressure-equalized in parts of the vacuum gripper means by using a compensation factor, wherein the compensation factor is stored and used for the next release cycle.

The invention, according to an object, solves the problem in ejector-driven vacuum systems, with sensing vacuum in each suction point requiring multiple sensors, since no sensors are needed on each suction point. Hence only one single centralized sensor is required. This also solves the problem with complex data management.

The invention, according to the various aspects and embodiments, solves the problem, which is frequently encountered in, but not limited to, applications with ergonomic lifting devices having a gripper with suction cups and equipped with energy saving.

SHORT DESCRIPTION OF THE DRAWINGS

Figure 2:
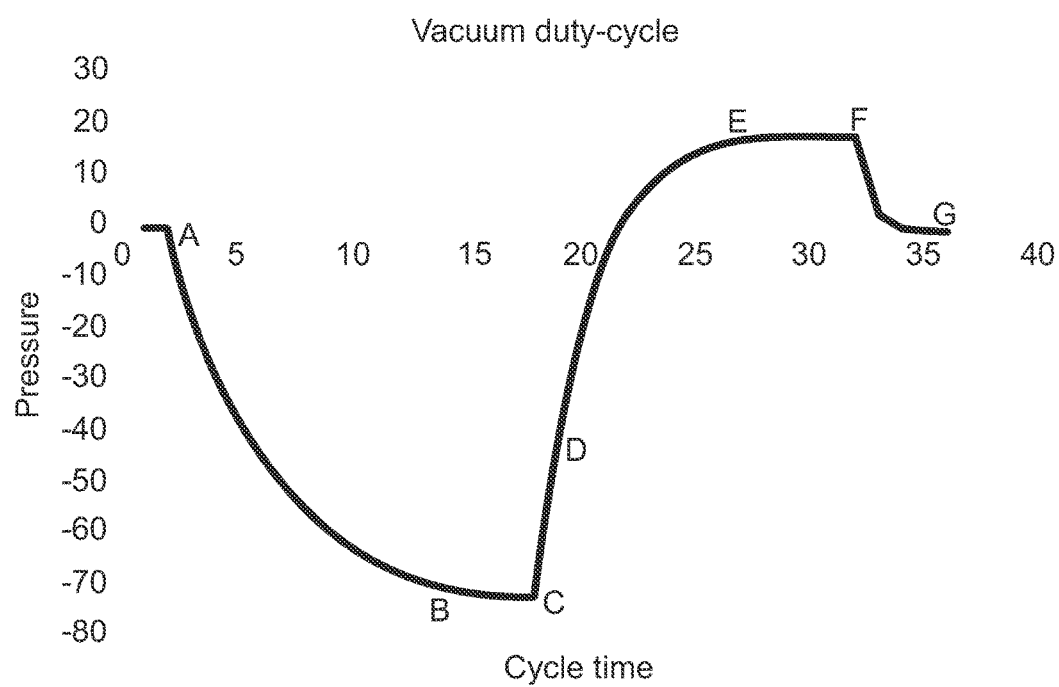

The invention is explained more in detail below with reference made to the accompanying drawing, wherein embodiments of the invention are illustrated schematically:

FIG. 1 is a schematic view of implementation of a control unit for a vacuum generator in a vacuum system 10 comprising a vacuum generator; and FIG. 2 is a release-cycle diagram of pressure vs. cycle time.

DETAILED DESCRIPTION OF EMBODIMENTS

For a general description of implementation of the invention in a vacuum system 10 for transportation of objects, reference is initially made to FIG. 1.

An embodiment of the invention will now be described with reference to FIG. 1, wherein details of the embodiment that correspond to the above description of the vacuum system will be indicated by the corresponding reference numbers that were previously used in FIG. 1.

The vacuum system 10 comprises a vacuum generator 3 driven by a compressed air flow via a first on/off valve 1, or other means for controlling the compressed air flow, wherein the vacuum generator 3, being part of the vacuum system 10, is arranged to be brought in flow connection with one or more vacuum grippers 6 also comprised in the vacuum system 10, in order to supply vacuum to the vacuum gripper 6 in result of the compressed air flow to the vacuum generator 3. The vacuum system 10 comprises a second valve 2 arranged to be activated, typically to be opened and to supply compressed air into the vacuum system 10. In FIG. 1, the line $P_{air\ source}$ represents the direction of compressed air flow from a compressed air supply source AIR SOURCE via the first valve 1 to the vacuum generator 3. The air supply source AIR SOURCE is typically the same both for supplying compressed air to the vacuum generator 3, in other words to the first valve 1, as well as to the second valve 2 for allowing compressed air into the system 10, for instance inside a vacuum chamber 11 (not limited to this), but via different supply connections 1a and 1b as illustrated in the figure.

A pressure sensor 4 is provided inside, or at, or centrally located in the vacuum system 10 for monitoring a system pressure P. The vacuum system 10 further comprises a vacuum system controller 5, referred to as a "controller". As an example, but without any limitation thereto, the valves 1 and 2 can either be directly operated solenoid-valves, or operating as pilot-valves to actuate piloted valves to supply the vacuum generator (first valve 1) and/or vacuum system 10 (second valve 2) with compressed air during a period of time until a blow-off is considered finished and the blow-off valve is closed. Thus, according to this embodiment, but limited only to this embodiment, in particular the opening and/or in particular the closing of the blow-off valve (second valve 2) is controlled. It is also possible, but not necessary that also the first valve 1 is closed.

Typically, the controller 5 is arranged to communicate with the first on/off valve 1, the second valve 2 and the pressure sensor 4. The vacuum system 10, and/or the vacuum generator 3 can be integrated with the controller 5 and the control-valves 1 and 2, as well as the system-pressure sensor 4 (sometimes also referred to as a pressure gauge), of which the latter can be used to monitor the system pressure P in the vacuum system 10, for instance in the vacuum chamber 11.

The controller 5 may be defined and/or operated by components including a specific control-algorithm implemented in an existing controller used for controlling the vacuum generator 3, but also other parts of the vacuum system. Now is referred also to FIG. 2 illustrating a vacuum duty cycle (pressure vs. cycle time), A-G and in particular a release cycle C-G will be described. The scales are only schematic, hence no units are considered required.

In point A, vacuum system pressure P is about 0 and evacuation of the vacuum system 10 is initiated and in B is evacuation of vacuum system complete such that an object can be gripped by means of the gripper 6.

When the on/off valve 1 is not flowing air to the vacuum generator 3, and the controller 5 indicates a state of no vacuum generation, for instance by a signal from the first valve 1, or the vacuum generator 3 per se to initiate release cycle C-G, possibly following venting to atmosphere pressure before activating blow-off, the controller 5 is arranged to activate, typically open, the second valve 2, allowing an amount of compressed air to flow into the vacuum-system 10 for blow-off.

If the on/off valve 1 is not flowing air to the vacuum generator 3, the vacuum system controller 5 indicates a state (see above) of no vacuum generation, and the second valve 2 is activated, allowing an amount of compressed air to flow into the vacuum-system 10 for blow-off, blow-off is initiated, point C. In point C-D a release flow pattern is realized and in point D flow equilibrium is established for the vacuum volume. In D to E vacuum system pressure is pressure-equalized at a rate dependent on one or more of: system volume, dimension of channels (plumbing), blow-off capacity, and leakage from atmosphere into the vacuum system (for instance due to porous object, or leakage at the gripper means sealing against the gripped object(s)). In point E to F, the vacuum system is being fully pressure-equalized in the parts of the gripper far away from the vacuum generator 3 and the sensor 4. In F to G blow-off is terminated and excessive compressed air injected into the vacuum system 10 via the second valve 2 is released through the gripper means 6, typically via the suction cups (only schematically shown in FIG. 1) in the gripper means 6.

According to the inventive method according to one embodiment, vacuum system properties is used and being characterized with respect to volume and flow-restriction in relation to the blow-off capacity of the blow-off function and for every release cycle wherein blow-off is terminated and excessive air injected into the system is released through the vacuum gripper means 6, analyzing pressure propagation following blow-off for calculating a duration of when the vacuum system 10 is being fully pressure-equalized E in parts of the vacuum gripper means by using a compensation factor k, wherein the compensation factor k is stored and used for the next release cycle.

By analyzing the pressure data, from the centralized sensor 4, at and between C and E, the vacuum system properties is characterized with respect to volume and flow-restriction in relation to the blow-off capacity of the blow-off function.

The time derivative given by Eq. 1 below $$dp/dt(p(t)) \text{ at } t \in C \rightarrow D \qquad \text{Eq. 1}$$

provides data of flow capacity in relation to the flow-restriction of the vacuum system.
The time derivative given by Eq. 2

$$dp/dt(p(t)) \text{ at } t=D \qquad \text{Eq. 2}$$

provides data of the vacuum volume in relation to the flow capacity.

By analyzing the pressure data function from D to E until $$dp/dt(p(t))=0 \qquad \text{Eq. 3}$$

establishing when (in time) point E occurs, combined with the data of Eq. 1, and the absolute pressure level at which point E occurs, then provides the complete data-set from which the duration of E to F is calculated using the compensation factor k.

For every cycle, the pressure propagation from F to G is analyzed, and the compensation factor k is stored and used for the next cycle.

Typically, the analysis is performed integrated in the vacuum generator 3 and/or sensor 4 uniquely for every vacuum duty cycle (as illustrated in FIG. 2).

Since typically, but without limitation thereto, only one system-pressure sensor 4 is used, there is no need for additional sensors and external functions. No sensors are needed on each vacuum gripper 6, for example suction cup, but only one centrally located, or centralized sensor as described above.

The invention, according to an object, solves the problem in ejector-driven vacuum systems, with sensing vacuum in each suction point requiring multiple sensors, since no sensors are needed on each suction point. Hence only one single centralized sensor is required.

This also solves the problem with complex data management.

According to an embodiment, the amount of compressed air that is allowed into the vacuum system 10 is determined based on duration of a previous release-cycle's air volume that was allowed into the vacuum system 10. The controller, as well as the inventive control method, according to various embodiments adapts the amount of compressed air allowed into the vacuum system 10, based on previous cycles of operation.

Blow-off is only activated as long as necessary, without over-compensating for application variations, so there is not waste.

The controller 5 or the inventive method requires no manual intervention or setting in order to be used. This is an advantage compared to prior art device often requiring intensive manual labor by the operator, or the operator setting control parameters having unnecessary long time periods to ensure proper venting to atmosphere. There is also no need for manual setting and calibration as the each cycle is evaluated and used automatically to improve performance.

Since blow off adapts automatically to the application, the need for an operator trimming and tuning the blow-off is no longer required by means of the invention according to an aspect. The invention enables ease of use.

An advantage with this embodiment is that, since the method and controller 5 is continuously adapting, and is only activated for as often and as long as necessary dictated by the actual need of the application.

The system-pressure P can be monitored continuously or periodically.

According to an embodiment, each previous release-cycle is analyzed and it's parameters re-evaluated autonomously.

According to an alternative embodiment, at point F, a clear signal, indicating that blow-off is terminated, is transmitted to a central control system (not illustrated). The vacuum system 10 or the controller 5 can be arranged to transmit the clear signal.

The vacuum generator 3, in FIG. 1 schematically illustrated, is typically realized as an ejector. The vacuum gripper means 6 may be realized as a suction cup, or as a set of suction cups that are commonly supplied from the vacuum generator 3.

It shall be noted that FIG. 1 merely depicts the general layout of a vacuum system for the purpose of illustrating the invention, and that a vacuum system in practice can comprise additional valves, sensors and flow connections in order to adapt the vacuum system to a desired functionality, as would be known to a person skilled in the art.

As an example, the components that define and/or operate the controller 5 in this example may be implemented by special-purpose software (or firmware) run on one or more general-purpose or special-purpose computing devices. Such a computing device may include one or more processing units, e.g. a CPU ("Central Processing Unit"), a DSP ("Digital Signal Processor"), an ASIC ("Application-Specific Integrated Circuit"), discrete analogue and/or digital components, or some other programmable logical device, such as an FPGA ("Field Programmable Gate Array"). In this context, it is to be understood that each "component" of the controller 5 refers to a conceptual equivalent of an algorithm; there is not always a one-to-one correspondence between components and particular pieces of hardware or software routines. One piece of hardware sometimes comprises different components. For example, the processing unit may serve as one component when executing one instruction, but serve as another component when executing another instruction. In addition, one component may be implemented by one instruction in some cases, but by a plurality of instructions in some other cases. The computing device may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The computing device may include one or more communication interfaces, such as a serial interface, a parallel interface, a USB interface, a wireless interface, a network adapter, etc. One or more I/O devices may be connected to the computing device, via a communication interface, including e.g. a keyboard, a mouse, a touch screen, a display, a printer, a disk drive, etc. The special-purpose software may be provided to the computing device on any suitable computer-readable medium, including a record medium, a read-only memory, or an electrical carrier signal.

Typically, all the functions to operate the controller and method are included in one compact package.

Even if only pressurised vacuum has been disclosed, the invention is not limited to this, but may be applicable also to other types of vacuum pumps in other types of negative, or vacuum systems for prediction of blow-off time.

The invention is defined in the accompanying claims, encompassing the above and other modifications of the invention which may be appreciated by the skilled person from the teachings provided above.

The invention claimed is:

1. A method for controlling a vacuum generator in a vacuum system for transportation of objects, which vacuum system comprises a vacuum generator driven by a compressed air flow via a first on/off valve, wherein the vacuum generator is arranged to be brought in vacuum flow connection with a vacuum gripper means when the vacuum generator is driven by the compressed air flow, in order to supply vacuum to the vacuum gripper means as a result of the compressed air flow, wherein the vacuum system further comprises a second valve, which when open supplies compressed air to the vacuum gripper means; the method comprising the steps of:

using one single centralized pressure sensor for monitoring a system pressure inside the vacuum system; and using a vacuum system controller to indicate a state of no vacuum generation if the first on/off valve is not flowing air to the vacuum generator and to activate the second valve for allowing an amount of compressed air to flow to the vacuum gripper means for blow-off, using vacuum system properties being characterized with respect to volume and flow-restriction in relation to the blow-off capacity of the blow-off function and for every release cycle wherein blow-off is terminated and excessive air injected into the system is released through the vacuum gripper means, analyzing pressure propagation following blow-off by means of a set of data provided by the single centralized pressure sensor to the controller, calculating a duration of when the vacuum system is being fully pressure-equalized in parts of the vacuum gripper means by using pressure propagation and a compensation factor, which is based on the pressure propagation from blow-off termination to pressure equilibrium of the previous release cycle, analyzing the pressure propagation form blow-off termination to pressure equilibrium resulting in a compensation factor, which is stored and used for the next release cycle for calculating a duration of when the vacuum system is being fully pressure-equalized in part of the vacuum gripper means.

2. The method according to claim 1, wherein the system pressure is monitored continuously by the single centralized pressure sensor.

3. The method according to claim 1, wherein the system pressure is monitored periodically by the single centralized pressure sensor.

4. The method according to claim 1, wherein the amount of compressed air that is allowed into the vacuum system is determined based on a previous release-cycle's compensation factor.

5. A controller for controlling a vacuum generator in a vacuum system for transportation of objects, which vacuum system comprises a vacuum generator driven by a compressed air flow via a first on/off valve, wherein the vacuum generator is arranged to be brought in flow connection with a vacuum gripper means by opening of the first on/off valve, in order to supply vacuum to the vacuum gripper means as a result of the compressed air flow, wherein the vacuum system further comprises a second valve, which when open supplies compressed air to the vacuum gripper means; one single centralized pressure sensor for monitoring a system pressure inside the vacuum system the controller being configured to communicate with the first on/off valve, the second valve and the pressure sensor, and the controller being configured to:
- activate the second valve for allowing an amount of compressed air to flow to the vacuum gripper means for blow-off,
- use vacuum system properties being characterized with respect to volume and flow-restriction in relation to the blow-off capacity of the blow-off function and for every release cycle wherein blow-off is terminated and excessive air injected into the system is released through the vacuum gripper means, and
- analyze pressure propagation following blow-off by means of a set of data provided by the single centralized pressure sensor to the controller, calculating a duration of when the vacuum system is being fully pressure-equalized in parts of the vacuum gripper means by using pressure propagation and a compensation factor, which is based on the pressure propagation from blow-off termination to pressure equilibrium of the previous release cycle, analyzing the pressure propagation from blow-off termination to pressure equilibrium resulting in a compensation factor, which is stored and used for the next release cycle for calculating a duration of when the vacuum system is being fully pressure-equalized in parts of the vacuum gripper means.

6. The controller according to claim 5, wherein the controller is arranged to monitor system pressure continuously.

7. The controller according to claim 5, wherein the controller is arranged to monitor vacuum system pressure periodically.

8. A vacuum system for transportation of objects, the vacuum system comprising:
- a vacuum gripper means;
- a vacuum generator driven by a compressed air flow via a first on/off valve, wherein the vacuum generator is arranged to be brought in vacuum flow connection with the vacuum gripper means when the vacuum generator is driven by compressed air flow, in order to supply vacuum to the vacuum gripper means as a result of the compressed air flow;
- a second valve, which when open supplies compressed air to the vacuum gripper means;
- one single centralized pressure sensor used for monitoring a system pressure inside the vacuum system; and
- a vacuum system controller, wherein the controller is arranged to communicate with the first on/off valve, the second valve and the single centralized pressure sensor, wherein if the first on/off valve is not flowing air to the vacuum generator, the vacuum system controller indicates a state of no vacuum generation, and activates the second valve allowing an amount of compressed air to flow to the vacuum gripper means for blow-off, the controller being configured to use vacuum system properties being characterized with respect to volume and flow-restriction in relation to the blow-off capacity of the blow-off function and for every release cycle wherein blow-off is terminated and excessive air injected into the system is released through the vacuum gripper means, to analyze pressure propagation following blow-off by means of a set of data provided by the single centralized pressure sensor to the controller, to calculate a duration of when the vacuum system is being fully pressure-equalized in parts of the vacuum gripper means by using the pressure propagation and a compensation factor, which is based on the pressure propagation from blow-off termination to pressure equilibrium of the previous release cycle, to analyze the pressure propagation from blow-off termination to pressure equilibrium resulting in a compensation factor, which is stored and used for the next release cycle for calculating a duration of when the vacuum system is being fully pressure-equalized in parts of the vacuum gripper means.

9. The vacuum system according to claim 8, wherein the controller is arranged to monitor vacuum system pressure continuously.

10. The vacuum system according to claim 8, wherein the controller is arranged to monitor vacuum system pressure periodically.

11. The vacuum system according to claim 8, wherein, when blow-off is terminated, the system, or the controller, is arranged to transmit a clear signal to a central control system.

* * * * *